United States Patent
Choudhary et al.

(10) Patent No.: US 6,534,440 B2
(45) Date of Patent: Mar. 18, 2003

(54) PROCESS FOR THE ACTIVATION OF A METALLIC PALLADIUM BASED CATALYST USEFUL FOR THE DIRECT OXIDATION OF HYDROGEN TO HYDROGEN PEROXIDE

(75) Inventors: Vasant Ramchandra Choudhary, Pune (IN); Abaji Govind Gaikwad, Pune (IN); Subhash Dwarkanath Sansare, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 78 days.

(21) Appl. No.: 09/725,640

(22) Filed: Nov. 29, 2000

(65) Prior Publication Data

US 2002/0103080 A1 Aug. 1, 2002

(51) Int. Cl.⁷ .................................................. B01J 23/44
(52) U.S. Cl. ......................... 502/333; 502/85; 502/325; 502/344; 502/352; 502/439
(58) Field of Search ............................ 423/584; 502/85, 502/325, 439, 333, 344, 352

(56) References Cited

U.S. PATENT DOCUMENTS 4,832,938 A * 5/1989 Gosser et al. ............... 423/584
5,399,334 A * 3/1995 Kawakami et al. .......... 423/584
5,772,977 A * 6/1998 Jenkins et al. ............... 423/588
6,346,228 B1 * 2/2002 Choudhary et al. ......... 423/584

FOREIGN PATENT DOCUMENTS

| DE | 41 27 918 A1 | * | 9/1992 |
| EP | 0 117 306 A1 | * | 9/1984 |
| JP | 1-133909 A | * | 5/1989 |
| WO | 93/14025 | * | 7/1993 |

* cited by examiner

Primary Examiner—Stanley S. Silverman
Assistant Examiner—Timothy C. Vanoy
(74) Attorney, Agent, or Firm—Ladas & Parry

(57) ABSTRACT

This invention provides a process for the activation of a metallic palladium containing catalyst which is useful for the direct oxidation of hydrogen by oxygen to hydrogen peroxide, by treating the catalyst with an oxidising agent in order to at least partially oxidise the metallic palladium contained in the catalyst to palladium (TT) oxide. The selectivity and yield of the catalyst for hydrogen peroxide are observed to increase substantially and the hydrogen peroxide decomposition activity of the catalyst is drastically reduced.

10 Claims, No Drawings

PROCESS FOR THE ACTIVATION OF A METALLIC PALLADIUM BASED CATALYST USEFUL FOR THE DIRECT OXIDATION OF HYDROGEN TO HYDROGEN PEROXIDE

FIELD OF THE INVENTION

The present invention relates to a process for the activation of a catalyst comprising of metallic palladium useful for the direct oxidation of hydrogen to hydrogen peroxide. This invention particularly relates to a process for the activation by bulk oxidation of metallic palladium catalyst in order to increase its selectivity and yield in the direct oxidation of hydrogen to hydrogen peroxide and also for decreasing its hydrogen peroxide decomposition activity.

The activated catalyst manufactured by the process of this invention can be used in chemical industries for the direct of hydrogen to hydrogen peroxide.

BACKGROUND OF THE INVENTION

Hydrogen peroxide is presently produced mostly by the anthraquinone process. However, this process is not environmentally clean and has several other limitations (Goor et. al, 'Hydrogen peroxide' in *Ullman's Encyclopedia of Industrial Chemistry*, eds. Elver et al, p 443–466, Vol. A 13, (1989), Publisher: VCH Verlangsgeselchaft mBH, Weinheim). Demand for hydrogen peroxide is constantly increasing due to its utility in oxidising organic compounds to value added products, waste water treatment, and water disinfection. Hence, there is a great practical need for replacing the anthraquinone process by an environmentally clean and more economical process such as direct partial oxidation of hydrogen by oxygen to hydrogen peroxide with high conversion and selectivity.

U.S. Pat. No. 1,108,752 granted to Henkel et al, discloses that palladium can function as a catalyst to promote the formation of hydrogen peroxide and water from a mixture of hydrogen and oxygen. Since then, several palladium containing catalysts useful for the direct oxidation of hydrogen by oxygen to hydrogen peroxide have been disclosed by many inventors.

U.S. Pat. No. 4,832,938 of Gosser et al discloses a Pt- Pd bimetallic catalyst supported on a carbon, silica or alumina support for making hydrogen peroxide from a direct combination of hydrogen and oxygen in an aqueous reaction medium. German Patent Ger. Offen. DE 4,127,918 by Lueckoff et al discloses a supported palladium gold catalyst for the manufacture of hydrogen peroxide from hydrogen and oxygen in an aqueous medium, the catalyst containing 5–95% Au and supported on carbon. A number of platinum Group metal containing catalysts: (1) Pt-Group metal on high surface area support such as carbon, silica or alumina (U.S. Pat. No. 5,169,618); (2) Pt-Group catalyst on solid acid carrier (European Patent Application 504,741A1); (3) Pt-Group element supported on Nb- or Ta oxide (PCT Publication No. WO/9412428A1); (4) Sn-modified Pt-Group metals supported on catalysts carriers (European Patent Application FP 621,235 A1); (5) Pt-Group metal catalyst supported on hydrophillic support (U.S. Pat. No. 5,399,334); for the oxidation of hydrogen to hydrogen peroxide are known in the art.

Japanese pat. Jpn. Kokai Tokkyo Koho JP 01133909 A2 by Kyora discloses a Pt-Group metal catalyst carried on a hydrophobic support such as porous and hydrophobic Teflon support. Chuang in European Pat. EP 366419A1 discloses a Group VIII metal catalyst deposited on a hydrophobic support for the manufacture of hydrogen peroxide by reacting hydrogen with oxygen in an aqueous medium. Chuang in PCT International Application WO 9314025A1 discloses a Group VIII metal catalyst on a partially hydrophobic and partially hydrophillic support, such as Pd on fluorinated carbon, for the oxidation of hydrogen to hydrogen peroxide.

Despite extensive research reported in the prior art, direct oxidation of hydrogen to hydrogen peroxide has not been practiced so far. One reason for this could be the poor selectivity observed in the process of direct oxidation. Fu et al report a maximum selectivity of 8.7% for hydrogen peroxide in the oxidation of hydrogen by oxygen over palladium metal supported on fluorided carbon. They have also reported that the catalyst having higher hydrogen peroxide decomposition shows lower selectivity in the direct oxidation of hydrogen to hydrogen peroxide (Fu et al, *Stud. Surf. Sci. Catal.* Vol. 72, p 33–41, (1992)). It is therefore of great practical importance to develop a catalyst containing palladium, which shows higher selectivity for hydrogen peroxide in the direct oxidation of hydrogen by oxygen to hydrogen peroxide but has lower activity for the decomposition of hydrogen peroxide under similar conditions.

OBJECTS OF THE INVENTION

The main object of the present invention is to provide a process for the activation of a palladium containing catalyst. In order to increase the hydrogen peroxide selectivity in the direct oxidation of hydrogen by oxygen.

It is another object of the invention to develop a catalyst containing palladium, which shows higher selectivity for hydrogen peroxide in the direct oxidation of hydrogen by oxygen to hydrogen peroxide but has lower activity for the decomposition of hydrogen peroxide under similar conditions.

It is a further object of the invention to provide a process for the activation of a palladium containing catalyst such that this yield of hydrogen peroxide is enhanced.

It is yet another object of the invention to provide a process for the activation of a palladium containing catalyst so as to reduce the hydrogen peroxide decomposition activity.

These and other objects of the invention are achieved by providing a process for the activation of a catalyst comprising palladium metal useful for the direct oxidation of hydrogen to hydrogen peroxide.

SUMMARY OF THE INVENTION

Accordingly the present invention provides a process for the activation of a palladium metal containing catalyst by treating the palladium metal containing catalyst with an oxidising agent to oxidise the at least partially the the metallic palladium present in the catalyst to palladium (II) oxide (PdO).

In one embodiment of the invention, the catalyst is treated with an oxidising agent selected from the group consisting of perchloric acid, perbromic acid, periodic acid, hydrogen peroxide, nitrous oxide, oxygen, air, potassium permagnate and potassium dichromate.

In a further embodiment of the invention, the oxidising agent is selected from the group consisting of perchloric acid, hydrogen peroxide, nitrous oxide, oxygen and air.

In a further embodiment of the invention, the activation of the catalyst is carried out in liquid phase or vapor phase depending on the state of the oxidising agent.

In another embodiment of the invention, the treated catalyst may preferably be calcined at a temperature in the range of from 50° C. to 500° C.

In a further embodiment of the invention, the calcination of the treated catalyst is carried out at a temperature in the range of from 100° C. to 300° C.

In another embodiment of the invention, the catalyst may contain palladium metal with or without one or more other noble metals selected from the group consisting of platinum, ruthenium, rhodium, iridium and osmium.

In another embodiment of the invention, the catalyst may also contain palladium metal with or without one or more of promoter metals such as tin, gold and other conventional metal promoters.

In yet another embodiment of the invention, the catalyst is supported on catalyst carriers selected from the group consisting of carbon, alumina, silica-alumina, silica, zeolites, zirconia, thoria, ceria and other metal oxides or mixed metal oxides in the form of a powder, pellets, extrudes or monolith and structured metallic catalyst supports.

In yet another embodiment of the invention, surface oxidation as well as at least a partial bulk oxidation of the metallic palladium present in the catalyst to palladium (II) oxide (PdO) occur.

DETAILED DESCRIPTION OF THE INVENTION

The production of hydrogen peroxide from the direct combination of hydrogen and oxygen is described in several patents and also in a research paper referred to above. However, the present invention is concerned with the activation of a palladium containing catalyst in order to increase the hydrogen peroxide selectivity of the catalyst in the direct oxidation of hydrogen by oxygen to hydrogen peroxide and also to decrease the hydrogen peroxide decomposition activity of the catalyst.

The palladium metal containing catalyst is activate by treating the catalyst with an oxidising agent in order to result in surface oxidation as well as at least a partial bulk oxidation of the metallic palladium present in the catalyst to palladium (II) oxide (PdO).

In the process of the invention, the activation of the palladium metal containing catalyst by its treatment with an oxidising agent involves at least a partial bulk oxidation of the metallic palladium to palladium oxide. Examples of the oxidising agent are perchloric acid, perbromic acid, periodic acid, hydrogen peroxide, nitrous oxide, oxygen or air, potassium permagnate, potassium dichromate and the like. The preferred oxidising agents are perchloric acid ($HClO_4$), hydrogen peroxide ($H_2O_2$), nitrous oxide ($N_2O$), oxygen and air.

The palladium metal containing catalyst may contain palladium metal with or without one or more other noble metals selected from the group consisting of platinum, ruthenium, rhodium, iridium and osmium. The catalyst may also contain palladium metal with or without one or more of promoter metals such as tin, gold and other conventional metal promoters, supported on catalyst carriers selected from the group consisting of carbon, alumina, silica-alumina, silica, zeolites, zirconia, thoria, ceria and other metal oxides or mixed metal oxides in the form of a powder, pellets, extrudes or monolith and structured metallic catalyst supports.

The treated catalyst may preferably be calcined at a temperature in the range of from 50° C. to 500° C., more preferably in the range of from 100° C. to 300° C. The activation of the catalyst is carried out in liquid phase or vapor phase depending on the state of the oxidising agent. Activation of the catalyst by a liquid oxidising agent such as perchloric acid or hydrogen peroxide may be carried out in liquid phase at a temperature below about 100° C. After activation, the treated catalyst may be dried and calcined under vacuum or under air or inert gas such as nitrogen, helium or argon at a temperature below 500° C., preferably at a temperature in the range of from 100° C. to 500° C. When the activation of the catalyst is done by a gaseous oxidising agent such as nitrous oxide or oxygen or air, the activation is done in gas phase at a temperature at or below about 500° C. In the case of gas phase activation, it is not necessary to dry or calcine the treated catalyst.

In the process of the invention, the role of the oxidising agent is to oxidise the bulk palladium metal from the catalyst to palladium oxide at least partially and the role of the calcination of the treated catalyst is to dry and/or remove the oxidising agent remaining in the treated catalyst by decompositon.

The product obtained is an activating catalyst containing palladium oxide which is useful for the direct oxidation of hydrogen to hydrogen peroxide.

The conversion at least partially of the bulk palladium metal contained in the catalyst to palladium (II) oxide results in decreasing the hydrogen peroxide decomposition activity of the catalyst. Thereby increasing the selectivity and yield of hydrogen peroxide in the direct oxidation of hydrogen by oxygen to hydrogen peroxide is enhanced substantially, The present invention is described with reference to the following examples illustrating the process of the invention for the activation of a palladium metal containing catalyst, useful for the direct oxidation of hydrogen by oxygen to hydrogen peroxide. The examples are illustrative and should not be construed to limit the scope of the present invention.

Definitions of terms used in the examples

Conversion of $H_2$ (%)=mole % of the hydrogen converted to all products.

Selectivity for $H_2O_2$(%)=[{conversion of $H_2$ to $H_2O_2$(%)}/ {conversion of $H_2$ to all products (%)}]×100

Yield of $H_2O_2$ (%)=mole (%) of $H_2$ converted to $H_2O_2$ =[{Conversion of $H_2$ (%)×Selectivity for $H_2O_2$(%)}] 100

Conversion of $H_2O_2$=mole % of the hydrogen peroxide decomposed to water and oxygen The flow rate of gases is measured at 0° C. and 1 atm. pressure. Gas Hourly Space Velocity (GHSV) is a volume of gas, measured at 0° C. and 1 atm. pressure, passed or bubbled through unit volume of liquid reaction medium containing catalyst per hour.

EXAMPLE 1

This example illustrates the process of this invention for the activation of Pd/carbon catalyst by its treatment with 0.1 M perchloric acid and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The activation of Pd (5 wt %)/carbon in powder form obtained from Lancaster Chemicals, England was carried out by treating 5 g of the catalyst with 9 ml to 0.1 M perchloric acid ($HClO_4$), while forming a paste, and then drying the paste at 80° C. for 2 hours. The dried mass was then calcined in static air at 300° C. for 2 hours to provide the activated Pd/carbon catalyst.

The crystalline phases of Pd compounds present in the catalyst before and after activation were determined from the Powder X-ray diffraction of the catalyst using a Holland, Philips, PW 1730 X-ray generator with Cu K-α radiation.

The direct oxidation of $H_2$ by $O_2$ to $H_2O_2$ over the catalyst was carried out at atmospheric pressure in a magnetically stirred glass reactor (capacity=250 $cm^{-3}$) containing 0.5 g catalyst and 150 $cm^{-3}$ of 0.02 mol % $H_2$ at a flow rate of 12 $cm^{-3}$ $min^{-1}$, through the reaction medium at 22 or 35° C. for 3 hours. The concentration of hydrogen in the reactor effluent gases was measured by an on line hydrogen gas analyzer. The $H_2O_2$ formed in the oxidation reaction was determined quantitatively by measuring the concentration of hydrogen peroxide in the reaction medium, after the reaction by the idiometric filtration method.

The decomposition of hydrogen peroxide over the catalyst was carried out at atmospheric pressure in the same reactor described above containing 0.2 g catalyst, 105 $cm^{-3}$ of 0.02 M sulphuric acid and 0.3 g of hydrogen peroxide, at 22 or 35° C. as a function of time. The amount of oxygen evolved in the $H_2O_2$ decomposition according to the reaction: $H_2O_2 \rightarrow H_2O + 0.5\ O_2$, was measured quantitatively as a function of time, by collecting over water using a constant gas collector described earlier (Choudhary et al, *Ind. Eng. Chem. Fundamental* Vol. 21, p. 472, (1982)).

Results of the catalyst with or without the activation are presented in Table 1 below;

TABLE 1

Results on the Pd/carbon with and without activation by 0.1 M perchloric acid treatment

|  | Catalyst without activation | Catalyst after the activation |
|---|---|---|
| X Ray Diffraction Data | | |
| Prominent 2 θ (degree) values of Pd-compounds | 40.0° and 46.4° | 33.5°, 39.9°, 54.4° |
| Cystalline phases of Pd-compounds | PD | PdO and Pd |
| Direct oxidation of $H_2$ by $O_2$ to $H_2O_2$ at 22° C. | | |
| $H_2$ conversion (%) | 44.9 | 53.1 |
| $H_2O_2$ selectivity (%) | <1.0 | 14.8 |
| $H_2O_2$ yield (%) | <0.4 | 7.9 |
| Decomposition of $H_2O_2$ at 22° 0 C. | | |
| $H_2O_2$ conversion (%) for a period of 5 min | 58.4 | 9.2 |

EXAMPLE 2

This example illustrates the process of this invention for the activation of Pd/carbon catalyst by its treatment with 1.0 M perchloric acid and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The activation of the catalyst was carried out by the same procedure as described in Example 1 except that 1.0 M perchloric acid was used instead of 0.1 M perchloric acid.

The crystalline phases of palladium compounds in the catalyst, before and after the treatment and also the performance of the catalyst, before and after the treatment, in the direct oxidation of $H_2$ by $O_2$ to $H_2O_2$ and also the decomposition of $H_2$ was determined using the same methods and experimental procedures as described in Example 1. The results on the catalyst with and without activation are presented in Table 2 below:

TABLE 2

Results on the Pd/carbon with and without activation by 1.0 M perchloric acid treatment

|  | Catalyst without activation | Catalyst after the activation |
|---|---|---|
| X Ray Diffraction Data | | |
| Prominent 2 θ (degree) values of Pd-compounds | 40.0° and 46.4° | 33.5°, 40.0°, 54.5° |
| Cystalline phases of Pd-compounds | Pd | PdO and Pd |
| Direct oxidation of $H_2$ by $O_2$ to $H_2O_2$ at 22° C. | | |
| $H_2$ conversion (%) | 44.9 | 59.2 |
| $H_2O_2$ selectivity (%) | <1.0 | 9.6 |
| $H_2O_2$ yield (%) | <0.4 | 5.7 |
| Decomposition of $H_2O_2$ at 22° 0 C. | | |
| $H_2O_2$ conversion (%) for a period of 5 min | 58.4 | 0.5 |

EXAMPLE 3

This example illustrates the process of this invention for the activation of Pd/carbon catalyst by its treatment with hydrogen peroxide and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The activation of the same catalyst as in Example 1 was carried out by treating the 1.0 g of catalyst with 40 $cm^{-3}$ of 30% $H_2O_2$ solution at 30° C. for 2 hours and after the treatment, the catalyst was filtered and dried at 100° C. for 2 hours.

The crystalline phases of palladium compounds in the catalyst, before and after tie treatment and also the performance of the catalyst, before and after the treatment, in the direct oxidation of $H_2$ by $O_2$ to $H_2O_2$ and also the decomposition of $H_2O_2$ was determined using the same methods an experimental procedures as described in Example 1. The results on the catalyst with and without activation are presented in Table 3 below;

TABLE 3

Results on the Pd/carbon with and without activation by hydrogen peroxide treatment

|  | Catalyst without activation | Catalyst after the activation |
|---|---|---|
| X Ray Diffraction Data | | |
| Prominent 2 θ (degree) values of Pd-compounds | 40.0° and 46.4° | 33.7°, 39.9°, 67.5° |
| Cystalline phases of Pd-compounds | Metallic Pd | PdO and Pd |
| Direct oxidation of $H_2$ by $O_2$ to $H_2O_2$ at 22° C. | | |
| $H_2$ conversion (%) | 44.9 | 70.8 |
| $H_2O_2$ selectivity (%) | <1.0 | 6.5 |
| $H_2O_2$ yield (%) | <0.4 | 4.6 |
| Decomposition of $H_2O_2$ at 22° 0 C. | | |
| $H_2O_2$ conversion (%) for a period of 5 min | 58.4 | 17.5 |

EXAMPLE 4

This example illustrates the process of this invention for the activation of Pd/carbon catalyst by its treatment with nitrous oxide and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The activation of the same catalyst as in Example 1 was carried out by contacting it with N20 gas at a space velocity of 300 $cm^{-3}$, $g^{-1}, h^{-1}$ at 250° C. in a tubular quartz reactor (i.d.=10 mm) for a period of 2 hours.

The crystalline phases of palladium compounds in the catalyst, before and after the treatment and also the performance of the catalyst, before and after the treatment, in the direct oxidation of $H_2$ by $O_2$ to $H_2O_2$ and also the decompositon of $H_2O_2$ was determined using the same methods and experimental procedures as described in Example 1. The results on the catalyst with and without activation are presented in Table 4 below:

TABLE 4

Results on the Pd/carbon with and without activation by $N_2O$ treatment

| | Catalyst without activation | Catalyst after the activation |
|---|---|---|
| X Ray Diffraction Data | | |
| Prominent 2 θ (degree) values of Pd-compounds | 40.0° and 46.4° | 33.6°, 40.1°, 54.5° |
| Cystalline phases of Pd-compounds | PD | PdO and Pd |
| Direct oxidation of $H_2$ by $O_2$ to $H_2O_2$ at 22° C. | | |
| $H_2$ conversion (%) | 44.9 | 31.8 |
| $H_2O_2$ selectivity (%) | <1.0 | 3.2 |
| $H_2O_2$ yield (%) | <0.4 | 1.2 |
| Decomposition of $H_2O_2$ at 22° 0 C. | | |
| $H_2O_2$ conversion (%) for a period of 5 min | 58.4 | 15.1 |

EXAMPLE 5

This example illustrates the process of this invention for the activation of Pd/alumina catalyst by its treatment with air and also shows that the hydrogen peroxide selectivity and yield in the direct oxidation of $H_2$ by $O_2$ or $H_2O_2$ over the catalyst increases by many folds and also that the hydrogen peroxide decomposition activity of the catalyst decreases drastically due to the activation of the catalyst.

The activation of the catalyst was carried out by heating Pd (5 wt %)/alumina catalyst obtained from Lancaster Chemicals, England under static air in a muffle furnace at 500° C. for 2 hours.

The crystalline phases of palladium compounds in the catalyst, before and after the treatment and also the performance of the catalyst, before and after the treatment, in the direct oxidation of $H_2$ by $O_2$ to $H_2O_2$ and also the decomposition of $H_2O_2$ was determined using the same methods and experimental procedures as described in Example 1. The result on the catalyst with and without activation are presented in Table 5 below:

TABLE 5

Results on the Pd/alumina with and without activation by air treatment

| | Catalyst without activation | Catalyst after the activation |
|---|---|---|
| X Ray Diffraction Data | | |
| Prominent 2 θ (degree) values of Pd-compounds | 39.8° | 33.6° and 39.9° |
| Cystalline phases of Pd-compounds | Pd | Pd and PdO |
| Direct oxidation of $H_2$ by $O_2$ to $H_2O_2$ at 22° C. | | |
| $H_2$ conversion (%) | 39.2 | 17.1 |
| $H_2O_2$ selectivity (%) | <1.0 | 7.4 |
| $H_2O_2$ yield (%) | <0.4 | 1.3 |
| Decomposition of $H_2O_2$ at 22° 0 C. | | |
| $H_2O_2$ conversion (%) for a period of 5 min | 35.9 | 1.5 |

EXAMPLE 6

This example illustrates the process of this invention for the activation of Pd/alumina catalyst by its treatment with $N_2O$ and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The activation of the same catalyst as described in Example 5 was carried out by the same procedure as described in Example 4.

The crystalline phases of palladium compounds in the catalyst, before and after the treatment and also the performance of the catalyst, before and after the treatment, in the direct oxidation of $H_2$ by $O_2$ to $H_2O_2$ and also the decomposition of $H_2O_2$ was determined using the same methods and experimental procedures as described in Example 1. The results on the catalyst with and without activation are presented in Table 6 below:

TABLE 6

Results on the Pd/alumina with and without activation by $N_2O$ treatment

| | Catalyst without activation | Catalyst after the activation |
|---|---|---|
| X Ray Diffraction Data | | |
| Prominent 2 θ (degree) values of Pd-compounds | 39.8° | 33.6° and 39.9° |
| Cystalline phases of Pd-compounds | Pd | Pd and PdO |
| Direct oxidation of $H_2$ by $O_2$ to $H_2O_2$ at 22° C. | | |
| $H_2$ conversion (%) | 39.2 | 43.1 |
| $H_2O_2$ selectivity (%) | <1.0 | 6.9 |
| $H_2O_2$ yield (%) | <0.4 | 3.0 |
| Decomposition of $H_2O_2$ at 22° 0 C. | | |
| $H_2O_2$ conversion (%) for a period of 5 min | 35.9 | 15.9 |

EXAMPLE 7

This example illustrates the process of this invention for the activation of Pd/alumina catalyst by its treatment with $H_2O_2$ and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The activation of the same catalyst as described in Example 5 was carried out by the same procedure as described in Example 3.

The crystalline phases of palladium compounds in the catalyst, before and after the treatment and also the performance of the catalyst, before and after the treatment, in the direct oxidation of $H_2$ by $O_2$ to $H_2O_2$ and also the decomposition of $H_2O_2$ was determined using the same methods and experimental procedures as described in Example 1. The results on the catalyst with and without activation are presented in Table 7 below:

TABLE 7

Results on the Pd/alumina with and without activation by $H_2O_2$ treatment

| | Catalyst without activation | Catalyst after the activation |
|---|---|---|
| X Ray Diffraction Data | | |
| Prominent 2 θ (degree) values of Pd-compounds | 39.8° | 33.6° and 39.7° |
| Cystalline phases of Pd-compounds | Pd | Pd and PdO |
| Direct oxidation of $H_2$ by $O_2$ to $H_2O_2$ at 22° C. | | |
| $H_2$ conversion (%) | 39.2 | 41.8 |
| $H_2O_2$ selectivity (%) | <1.0 | 7.6 |
| $H_2O_2$ yield (%) | <0.4 | 3.2 |
| Decomposition of $H_2O_2$ at 22° 0 C. | | |
| $H_2O_2$ conversion (%) for a period of 5 min | 35.9 | 2.1 |

EXAMPLE 8

This example illustrates the process of this invention for the activation of Pd/alumina catalyst by its treatment with $HclO_4$ and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The activation of the same catalyst as described in Example 5 was carried out by the same procedure as described in Example 1.

The crystalline phases of palladium compounds in the catalyst, before and after the treatment and also the performance of the catalyst before and after the treatment, in the direct oxidation of $H_2$ by $O_2$ to $H_2O$ and also the decomposition of $H_2O_2$ was determined using the some methods and experimental procedures as described in Example 1. The results on the catalyst with and without activation are presented in Table 8 below:

TABLE 8

Results on the Pd/alumina with and without activation by $HclO_4$ treatment

| | Catalyst without activation | Catalyst after the activation |
|---|---|---|
| X Ray Diffraction Data | | |
| Prominent 2 θ (degree) values of Pd-compounds | 39.8° | 33.9° and 39.5° |
| Cystalline phases of Pd-compounds | Pd | Pd and PdO |
| Direct oxidation of $H_2$ by $O_2$ to $H_2O_2$ at 22° C. | | |
| $H_2$ conversion (%) | 39.2 | 29.8 |
| $H_2O_2$ selectivity (%) | <1.0 | 21.3 |
| $H_2O_2$ yield (%) | <0.4 | 6.3 |
| Decomposition of $H_2O_2$ at 22° 0 C. | | |
| $H_2O_2$ conversion (%) for a period of 5 min | 35.9 | <0.5 |

EXAMPLE 9

This example illustrates the process of this invention for the activation of $Pd/CeO_2$ catalyst by its treatment with oxygen and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The Pd (2.5 wt %)/$CeO_2$ catalyst was prepared by impregnating palladium chloride on $CeO_2$ and then by reduction the impregnated catalyst mass with ammoniacal solution of hydrazine. After the reduction, the catalyst was washed with pure water and then dried on a water bath.

The activation to the $Pd/CeO_2$ catalyst was carried out by contacting it with pure oxygen at 500° C. in a tubular quartz reactor at a space velocity of 500 $cm^{-3}$, $g^{-1}$, $h^{-1}$ for 2 hours.

The crystalline phases of palladium compounds in the catalyst, before and after the treatment and also the performance of the catalyst, before and after the treatment, in the direct oxidation of $H_2$ by $O_2$ to $H_2O_2$ and also the decomposition of $H_2O_2$ was determined using the same methods and experimental procedures as described in Example 1. The results on the catalyst with and without activation are presented in Table 9 below:

TABLE 9

Results on the $Pd/CeO_2$ with and without activation by oxygen treatment

| | Catalyst without activation | Catalyst after the activation |
|---|---|---|
| X Ray Diffraction Data | | |
| Prominent 2 θ (degree) values of Pd-compounds | 39.7° | 33.7° and 39.9° |
| Cystalline phases of Pd-compounds | Pd | Pd and PdO |
| Direct oxidation of $H_2$ by $O_2$ to $H_2O_2$ at 22° C. | | |
| $H_2$ conversion (%) | 38.5 | 41.1 |
| $H_2O_2$ selectivity (%) | <1.0 | 47.9 |
| $H_2O_2$ yield (%) | <0.4 | 19.7 |
| Decomposition of $H_2O_2$ at 22° 0 C. | | |
| $H_2O_2$ conversion (%) for a period of 5 min | 63.1 | <1.0 |

EXAMPLE 10

This example illustrates the process of this invention for the activation of $Pd/ThO_2$ catalyst by its treatment with air and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due in the activation of the catalyst.

The Pd (2.5 wt %)/$ThO_2$ catalyst was prepared by impregnating palladium chloride on $ThO_2$ and then by reducing the impregnated catalyst mass with ammoniacal solution of hydrazine. After the reduction, the catalyst was washed with pure water and then dried on a water bath.

The activation or the Pd/$ThO_2$ catalyst was carried out by the same procedure as described in Example 5.

The crystalline phases of palladium compounds in the catalyst, before and after the treatment and also the performance of the catalyst, before and after the treatment, in the direct oxidation of $H_2$ by $O_2$ to $H_2O_2$ and also the decomposition of $H_2O_2$ was determined using the same methods and experimental procedures as described in Example 1. The results on the catalyst with and without activation are presented in Table 10 below:

TABLE 10

Results on the Pd/$ThO_2$ with and without activation by air treatment

| | Catalyst without activation | Catalyst after the activation |
|---|---|---|
| X Ray Diffraction Data | | |
| Prominent 2 θ (degree) values of Pd-compounds | 39.6° | 33.8° and 39.7° |
| Cystalline phases of Pd-compounds | Pd | Pd and PdO |
| Direct oxidation of $H_2$ by $O_2$ to $H_2O_2$ at 22° C. | | |
| $H_2$ conversion (%) | 37.2 | 39.2 |
| $H_2O_2$ selectivity (%) | 2.1 | 43.5 |
| $H_2O_2$ yield (%) | 0.8 | 17.1 |
| Decomposition of $H_2O_2$ at 22° 0 C. | | |
| $H_2O_2$ conversion (%) for a period of 5 min | 56.2 | <1.0 |

EXAMPLE 11

This example illustrates the process of this invention for the activation of Pd - Pt/$Gd_2O_3$ catalyst by its treatment with air and also shows that the hydrogen peroxide selectivity and yield in the direct oxidation of $H_2$ by $O_2$ to $H_2O_2$ over the catalyst increases by many folds and also that the hydrogen peroxide decomposition activity of the catalyst decreases drastically due to the activation of the catalyst.

The Pd (2.5 wt %)-Pt(0.13 wt %)/$Ga_2O_3$ catalyst was prepared by impregnating the requisite amount of palladium chloride and chloroplatinic acid on $Ga_2O_3$ and then by reducing the impregnated catalyst mass with ammoniacal solution of hydrazine. After the reduction, the catalyst was washed with pure water and then dried on a water bath.

The activation of the Pd - Pt/$Ga_2O_3$ catalyst was carried out by the same procedure as described in Example 10.

The crystalline phases of palladium compounds in the catalyst, before and after the treatment and also the performance of the catalyst, before and after the treatment, in the direct oxidation of $H_2$ by $O_2$ to $H_2O_2$ and also the decomposition of $H_2O_2$ was determined using the same methods and experimental procedures as described in Example 1. The results on the catalyst with and without activation are presented in Table 11 below:

TABLE 11

Results on the Pd - Pt/$Ga_2O_3$ with and without activation by air treatment

| | Catalyst without activation | Catalyst after the activation |
|---|---|---|
| X Ray Diffraction Data | | |
| Prominent 2 θ (degree) values of Pd-compounds | 39.8° | 33./° and 39.9° |
| Crystalline phases of Pd-compounds | Pd | Pd and PdO |
| Direct oxidation of $H_2$ by $O_2$ to $H_2O_2$ at 22° C. | | |
| $H_2$ conversion (%) | 25.3 | 28.7 |
| $H_2O_2$ selectivity (%) | 1.5 | 77.5 |
| $H_2O_2$ yield (%) | 0.4 | 22.2 |
| Decomposition of $H_2O_2$ at 22° C. | | |
| $H_2O_2$ conversion (%) for a period of 5 min | 39.7 | <1.0 |

From the results in all the above 11 examples, the following observations and conclusions can be made:
1. After the activation by the process of this invention, the metallic palladium present in the different catalyst treated is partially oxidised to PdO.
2. Because of the catalyst activation by the process of this invention, the selectivity and yield for $H_2O_2$ in the direct oxidation of $H_2$ to $H_2O_2$ increases drastically and also in most cases the $H_2$ conversion also increases.
3. Because of the catalyst activation by the process of this invention, the hydrogen peroxide decomposition activity of the catalyst also decreases drastically.

Advantages of the invention

1. The yield and selectivity for hydrogen peroxide in a direct oxidation of hydrogen to $H_2O_2$ is increased due the activation of the palladium containing catalyst by treatment with an oxidising agent.
2. Bulk oxidation of at least a part or the palladium present in the catalyst to palladium oxide occurs during the activation of the catalyst.
3. The hydrogen peroxide decomposition activity of the catalyst is also reduced drastically due to the activation of the catalyst thereby increasing the yield and selectivity of the catalyst for hydrogen peroxide.

We claim:

1. A process for the activation of a palladium metal containing catalyst by treating the palladium metal containing catalyst with an oxidising agent selected from the group consisting of perchloric acid, perbromic acid, periodic acid, hydrogen peroxide, nitrous oxide, potassium permanganate, potassium dichromate and mixtures thereof to oxidise the metallic palladium present in the catalyst at least partially to palladium (II) oxide (PdO).

2. A process as claimed in claim 1 wherein the oxidizing agent is selected from the group consisting of perchloric acid, hydrogen peroxide, nitrous oxide and mixtures thereof.

3. A process as claimed in claim 1 wherein the activation of the catalyst is carried out in gaseous phase when the oxidizing agent is nitrous oxide.

4. A process as claimed in claim 1 wherein the activated catalyst is calcined at a temperature in the range of from 50° C. to 500° C.

5. A process as claimed in claim 4 wherein teh calcination of the activated catalyst is carried out at a temperature in the range of from 100° C. to 300° C.

6. A process as claimed in claim 1 wherein the catalyst contains palladium metal with one or more of other noble metals selected from the group consisting of platinum, ruthenium, rhodium, iridium, osmium and mixtures thereof.

7. A process as claimed in claim 1 wherein the catalyst contains palladium metal with one or more promoter metals selected from the group consisting of tin, gold and mixtures thereof.

8. A process as claimed in claim 1 wherein the catalyst is supported on catalyst carriers selected from the group consisting of carbon, alumina, silica-alumina, silica, zeolites, zirconia, thoria, ceria and mixtures thereof in the form of powders, pellets, extrudes or monolith and structured metallic catalyst supports.

9. A process as claimed in claim 1 wherein the metallic palladium present in the catalyst is oxidized to palladium (II) oxide (PdO) to result in surface oxidation and partial bulk oxidation.

10. A process as claimed in claim 1 wherein the activation of the catalyst is carried out in the liquid phase when the oxidizing agent is selected from hydrogen peroxide, perchloric acid, periodic acid and potassium permangnate.

* * * * *